May 8, 1945.   G. D. HENRY   2,375,651
SAW
Filed April 5, 1943
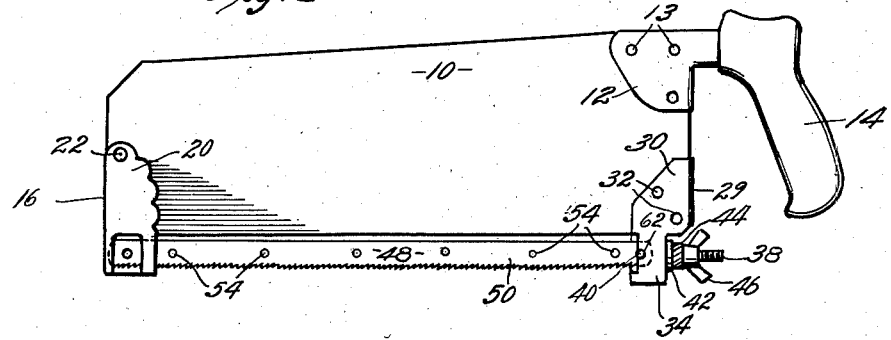
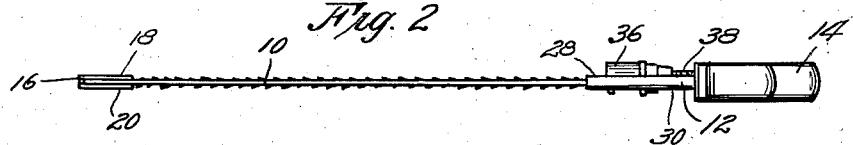
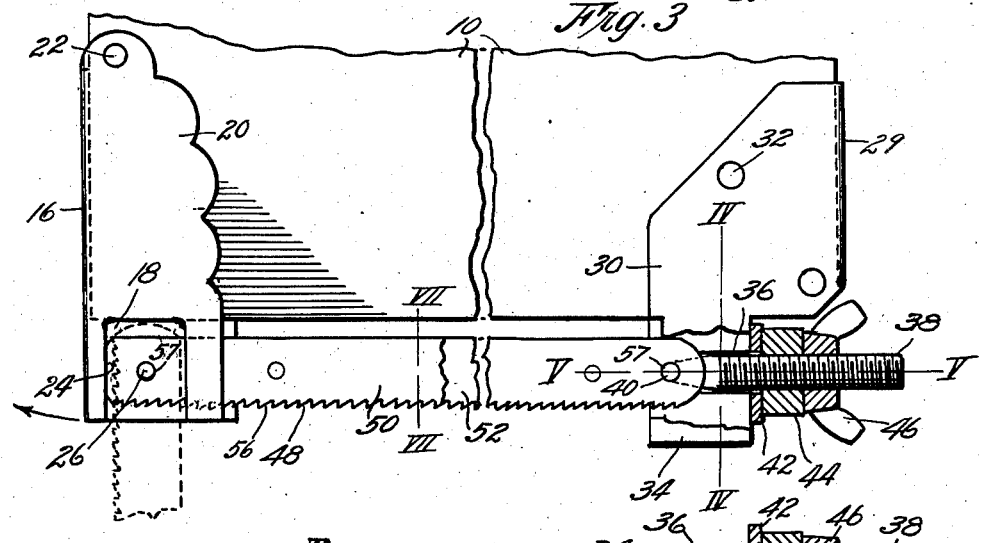
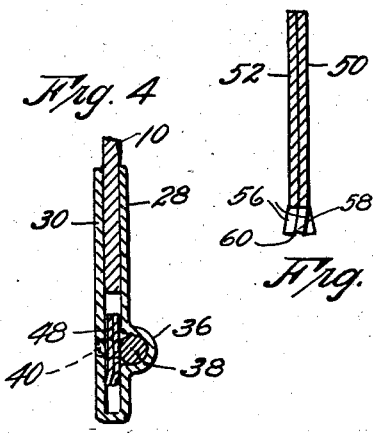
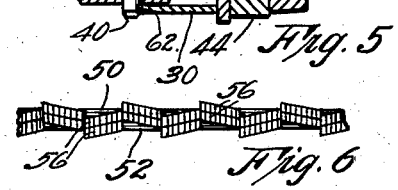
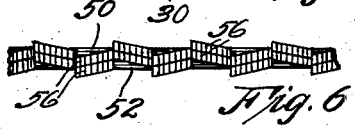
INVENTOR,
George D. Henry.
BY
Roy E. Hamilton, Attorney.

Patented May 8, 1945

2,375,651

UNITED STATES PATENT OFFICE 2,375,651

SAW

George D. Henry, Kansas City, Mo.

Application April 5, 1943, Serial No. 481,934

2 Claims. (Cl. 145—33)

This invention relates to improvements in saws and has particular reference to a hand saw suitable for sawing metal or wood.

The principal object of the present invention is the provision of a saw having a specially constructed saw blade which will readily cut woods or metals without interfering with its cutting edges.

Another object of the invention is the provision of a narrow saw blade carried by a sheet metal frame or body which will follow entirely through the kerf formed by the blade.

A further object is the provision of a blade holder having novel means whereby the saw blade may be easily and quickly inserted or removed from the operating position in the holder.

Other objects are simplicity and economy of construction, ease and accuracy of operation, and adaptability for use in sawing all types of materials.

Reference will now be had to the drawing wherein:

Figure 1 is a side elevation of a saw embodying this invention.

Fig. 2 is a top edge view of the saw shown in Fig. 1.

Fig. 3 is an enlarged fragmentary view, partly in section, of the saw in the frame mounting.

Fig. 4 is a vertical sectional view taken on line IV—IV of Fig. 3.

Fig. 5 is a horizontal sectional view taken on line V—V of Fig. 3.

Fig. 6 is an enlarged edge view of the saw looking at the saw teeth.

Fig. 7 is an enlarged sectional view of the saw blade taken on line VII—VII of Fig. 3.

Throughout the several views like reference characters refer to similar parts and the numeral 10 designates a planar, sheet metal body having a bracket 12 secured by rivets 13 or by spot welding to its upper rear edge to receive a suitable hand grip 14 by means of which the saw is operated. This body or blade member 10 is preferably made of a good grade of spring steel that will maintain its normal planar form under normal sawing conditions and will have sufficient strength to support the saw blade in a manner hereinafter set forth, without any material flexing.

The lower front portion of the body 10 is provided with a folded bracket 16 having spaced apart walls 18 and 20 which encompasses a portion of body 10 and which is pivoted thereto by means of pin 22 to permit rocking of the bracket relative to the body member 10 in the direction indicated by the arrow in Fig. 3. A bight 24 is formed upwardly from the bottom edge into the wall 20 of the bracket 16 while the opposite wall 18 thereof carries a rigidly mounted post 26 which extends transversely of the saw into bight 24.

The lower rear portion of frame body 10 is provided with a folded sheet metal bracket 29 having spaced apart walls 28 and 30 which encompass a corner portion of body 10 and are rigidly attached thereto by means of rivets 32 or by welding. A depending open loop 34 extends below the body 10 and has its one side wall offset at 36 to receive the saw adjusting bolt 38 which is provided at its forward end with a transverse saw engaging post 40. This bolt 38 extends into loop 34 and is provided at its rear portion with a wood fiber washer 42 which rests against the rear edge of said loop and serves as a bearing for the knurled nut 44 which is backed up by a winged lock nut 46.

The saw blade 48 is made of two hack saw blades 50 and 52 of like construction laid side to side and spot welded at 54 so that corresponding teeth 56 and holes 57 are in register.

The set of the saw teeth 56 are identical so that they intermesh as shown in Fig. 6 and also in Fig. 7. Due to the tilting of the teeth the outer point 58 of the tooth on blade 50 will be slightly spaced from the inner point 60 of blade 52 thus presenting a better cutting saw edge than could be obtained by making a tooth in a blade of a single sheet as thick as the two blades combined. In other words this double blade construction presents a cutting edge that is far superior to a cutting edge made on a single blade twice the thickness of the blade 50 or 52. In some instances it might be found advantageous to have the saw teeth of the two blades slightly offset longitudinally to obtain a different cutting action.

It will be noted that the set of the saw teeth is such that the saw kerf will be slightly wider than the thickness of saw body 10 so that the body 10 can follow through the kerf to steady the saw and maintain a straight cut to any desired depth. A notch 62 is formed in wall 32 to receive the post 40 so as to maintain the blade in fixed position relative to the blade holding parts.

When it is desired to change the saw blade the nuts 44 and 46 are screwed back on the bolt 38 a sufficient distance to permit the end of the saw blade to clear the edge of the loop 34. Bracket 16 is then moved on its pivot 22 to permit longitudinal movement of the saw from engagement with loop 34. The rear end of the blade can now be moved transversely from the post 40 and hinged downwardly until the blade registers with the bight 24 (see Fig. 3, dotted lines) then the blade can be lifted from post 26. This procedure is reversed when inserting a new blade.

I claim:

1. A hand saw comprising a holder having a planar sheet metal body; a bracket having a recess to receive the lower outer end portion of said body member in said recess and pivoted to the body for swinging movement relative thereto; a looped bracket carried by the rear end of said body portion, a saw blade adapted to cut a kerf wider than the thickness of said planar sheet metal body secured at its one end to said hinged bracket, and its other end positioned in said looped bracket, and adjustable means whereby said saw blade is drawn taut in alignment below said body member whereby said sheet metal body may be passed entirely through a member being sawed.

2. A hand saw comprising a holder having a planar sheet metal body; a bracket having a recess to receive the lower outer end portion of said body member in said recess and pivoted to the body for swinging movement relative thereto; a depending bracket carried by the rear end of said body portion, a saw blade adapted to cut a kerf wider than the thickness of said planar sheet metal body secured at its one end to said hinged bracket and at its other end to said depending bracket; and adjustable means whereby said saw blade is drawn taut in alignment below said body member.

GEORGE D. HENRY.